Oct. 8, 1957 K. E. GOODE 2,809,005
SHOCK AND VIBRATION MOUNT HAVING NON-ROTATIONAL FEATURES
Filed Oct. 6, 1954 2 Sheets-Sheet 1

INVENTOR.
KENNETH E. GOODE
BY
ATTYS.

Oct. 8, 1957  K. E. GOODE  2,809,005
SHOCK AND VIBRATION MOUNT HAVING NON-ROTATIONAL FEATURES
Filed Oct. 6, 1954  2 Sheets-Sheet 2

INVENTOR.
KENNETH E. GOODE
BY
ATTYS.

United States Patent Office 2,809,005
Patented Oct. 8, 1957

2,809,005

SHOCK AND VIBRATION MOUNT HAVING NON-ROTATIONAL FEATURES

Kenneth E. Goode, Indianapolis, Ind., assignor to the United States of America as represented by the Secretary of the Navy Application October 6, 1954, Serial No. 460,785

3 Claims. (Cl. 248—358)

(Granted under Title 35, U. S. Code (1952), sec. 266)

The invention described herein may be manufactured and used by or for the Government of the United States of America for governmental purposes without the payment of any royalties thereon or therefor.

This invention relates to a shock and vibration absorber and more particularly to an absorber for mounting a precision instrument, such as a gyroscope, in a resilient manner such that the instrument will not rotate about any axis.

Shock and vibration problems have reached enormous magnitudes, particularly in aircrafts, due to the increased speeds and firepower of military crafts. The increased speeds and complexity of present day aircrafts have also resulted in the development of various instruments which are used to aid a pilot in flying an aircraft and in launching a projectile. Many of these instruments are expensive to build and have delicate mechanisms that should be protected from damaging shocks and vibrations.

Foremost among the precision instruments available for aiding a pilot in flying a craft and firing a projectile is the gyroscope, an instrument used to measure the degree of rotation between one of its axes and an axis of an aircraft. Any rotation of a gyroscope due to the rocking of a vibration and shock mount will introduce an error into the gyroscope's output data, and consequently heretofore most gyroscopes were mounted fixedly to the deck or bulkhead of a carrier, such as an aircraft, thus subjecting the gyroscopes to vibrations and shocks of large magnitudes which resulted in damage to the precision parts of the gyroscopes.

There are numerous types of resilient shock and vibration mounts available for mounting some types of precision instruments. These mounts employ springs, rubber, and wire mesh means for dampening applied forces. However, all available absorbers have the inherent disadvantage of rocking and rotating about their axes, and therefore are not suitable for mounting gyroscopes.

The shock and vibration mount disclosed herein overcomes the disadvantages of heretofore known shock and vibration mounts by permitting translation but not rotation. The device described herein has resilient mounting means for absorbing vibration and shock and is provided with means to maintain linear motion along three mutually perpendicular axes. When an applied force is transmitted to the mount described herein, the resilient mounting means will absorb the energy before the damaging force reaches a sensitive instrument, such as a gyroscope. In absorbing this energy, the mount will vibrate or translate, but only in the directions allowable by the linear directing means. Thus any rotational motion which would cause error in a gyroscope's output data is eliminated.

An engineering model of a mount similar to one described herein was tested at frequencies ranging from 0–100 cycles per second and amplitudes of 0–⅛ inch and the maximum observed rotation about any axis was 1.5 mils.

It is therefore an important object of this invention to provide a shock and vibration mount suitable for the mounting of precision instruments in aircrafts.

Another object of this invention is to provide a shock and vibration mount that will adequately protect an instrument from applied forces and yet not allow the instrument to rock or rotate about any axis.

A further object of this invention is to provide a small, compact shock and vibration absorber that will translate in one or more of three mutually perpendicular planes while limiting any rotation about any of the said axes.

Other objects and many attendant advantages of this invention will be readily appreciated as the same becomes better understood by reference to the following detailed description when considered with the accompanying drawings in which.

Figure 1:
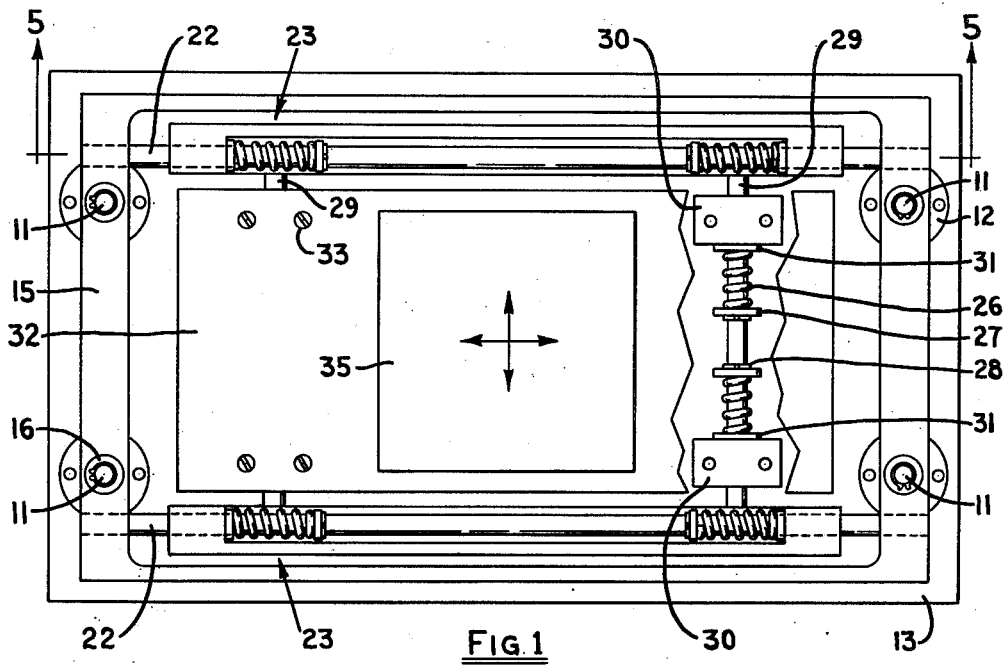
Fig. 1 is a top plan view showing the preferred embodiment of the invention, partially broken away to show dampening elements.
Figure 2:
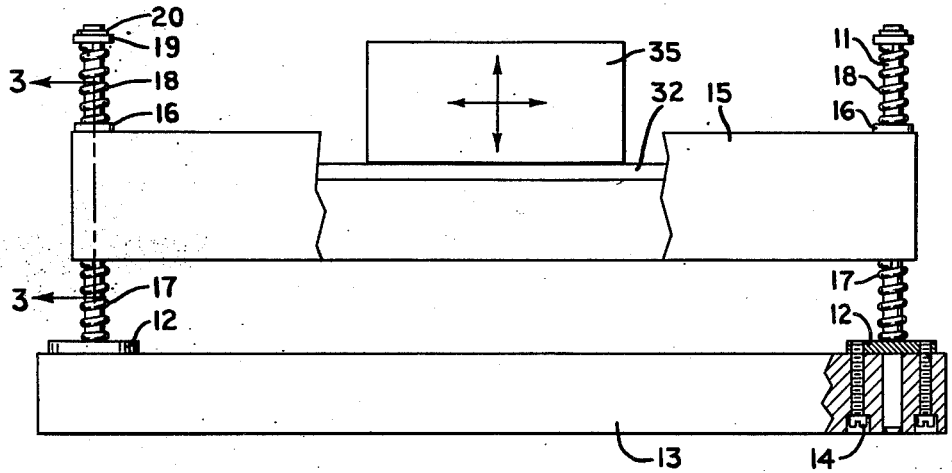
Fig. 2 is a side view, partly broken away and partly in section, showing the elements used for dampening in the vertical direction.
Figure 3:
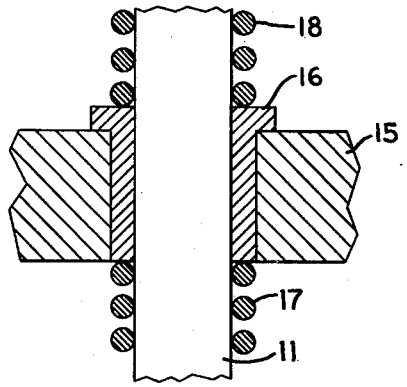
Fig. 3 is an enlarged partial sectional view taken on the line 3—3 of Fig. 2 and shows the details for obtaining linear motion in the vertical direction.

Referring to Figs. 1 and 2 which show the preferred embodiment of the invention, it will be seen that four shafts 11, each having a flange 12, are mounted perpendicular to a base 13 and secured by means of cap screws 14. As shown by Figs. 2 and 3, an intermediate member 15, which is provided with four bronze bushings 16 having bores approximately .0003 inch greater than the outside diameter of the shafts 11, guides on the four shafts 11.

Four springs 17, having inside diameters slightly greater than the outside diameter of the shafts 11, fit on the shafts 11 and support the intermediate member 15. Four additional springs 18, similar to springs 17, are fitted on the shafts 11 above the intermediate member 15 and are maintained in compression by means of a washer 19 and a retaining ring 20. The close fitting of the four shafts 11 in the bushings 16 allows the intermediate member 15 to move in a direction perpendicular to the base 13, but eliminates the possibility of having any transversal or rocking motion.

Figure 4:
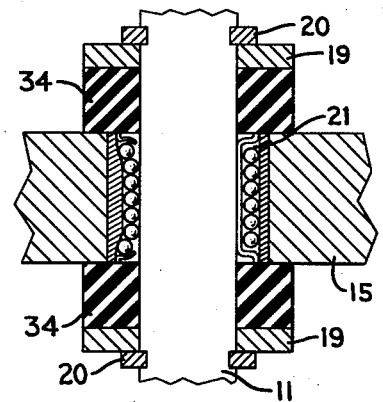
Fig. 4 is a view similar to Fig. 3, but showing rubber dampening means and a ball bushing for guiding the linear motion of a shaft.

Although Fig. 3 of the drawings shows the preferred means for obtaining linear motion, an alternate method is illustrated in Fig. 4 of the drawings wherein a ball bushing 21 is shown guiding one of the four shafts 11 in a direction perpendicular to the base 13. Fig. 4 also shows the use of soft rubber spacers 34 for dampening. Although not shown by the drawings, it is obvious that the springs 17 and 18 could be used in conjunction with the ball bushing 21 and that the soft rubber spacers 34 could be used with the bushing 16.

Figure 5:
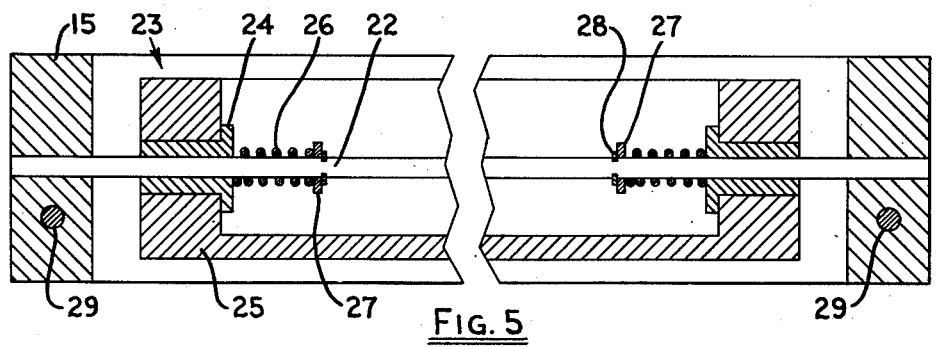
Fig. 5 is a partial sectional view taken on line 5—5 of Fig. 1 and shows the details for obtaining linear motion in a horizontal plane.

Referring again to Fig. 1 of the drawings it can be seen that two parallel shafts 22 are fixed to the intermediate member 15, each shaft supporting a carriage member, generally referred to by the reference character 23, which is shown more particularly in Fig. 5 of the drawing. Fig. 5 shows in section one of the two identical carriage members 23 wherein two bushings 24, each having a bore approximately .0003 inch greater than the outside diameter of the shaft 22, are press fitted in opposite ends of a carriage portion 25, a carriage member 23 being then slidable on each of the two parallel shafts 22. A pair of springs 26, each having an inside diameter slightly greater than the outside diameter of one of two parallel shafts 22, are held in compression by means of washers 27 and retaining rings 28. It can readily be seen that movement of the carriage member 23 along one of the two parallel shafts 22 will increase the compression of one of the two springs 26 and decrease the compression of the other spring 26, causing an unbalanced force tending to return the carriage member 23 to its original stable position.

Referring again to Figs. 1 and 5, it will be seen that a second pair of parallel shafts 29, which are mounted perpendicular to the first pair of parallel shafts 22, are fixed between the two movable carriage members 23. Each parallel shaft 29 carries two mounting blocks 30 which have bushings 31 similar to the bushings 24 in the carriage member 23. These bushings 31 also have bores that are approximately .0003 inch greater than the outside diameter of the shafts 29. The two mounting blocks 30 are maintained in a stable position by a pair of springs 26 which are held in compression by washers 27 and retaining rings 28. A mounting plate 32 is fixed to the four mounting blocks 30 by screws 33.

Since the second pair of parallel shafts 29 are fixed to the two movable carriage members 23, these two movable carriage members 23 move in unison in a plane which is parallel to the base 13. Likewise, when the mounting plate 32 is fastened to the four mounting blocks 30, the said mounting blocks 30 are constrained to move in unison in a plane parallel to the base 13 and in a direction which is perpendicular to the direction in which the carriage members 23 are movable. The close fitting of all shafts in their respective bushings eliminates the possibility of any rocking of a unit 35 which is mounted on the mounting plate 32, yet permitting the unit 35 to translate along any or all of three axes.

In operation the base 13 will be fixed to a deck or bulkhead of a carrier, such as an airplane or ship, and the mounting plate 32 will be adapted to secure a sensitive instrument 35, such as a gyroscope. Any vibrations induced by an oscillating force, such as a reciprocating mass, will be transmitted to the base 13 and then absorbed or dampened by the resilient elements. Also any shocks that are imparted by a suddenly applied force, such as the impact received by an airplane on making a landing, will be absorbed by the resilient isolators and the energy absorbed will be released at a slower rate, thus minimizing damage to the sensitive instrument 35 which is secured to the mounting plate 32.

Figure 6:
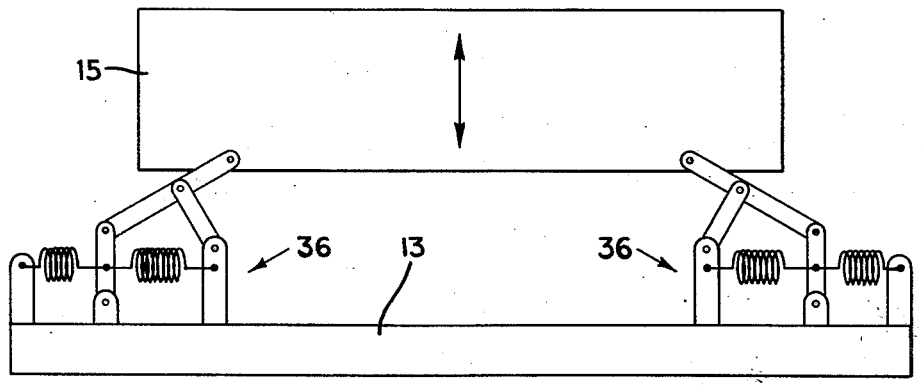
Fig. 6 is a view similar to Fig. 2 showing modifications using a straight-line-motion mechanism.

Obviously many modifications and variations of the present invention are possible in the light of the above teaching. For example, in Fig. 6 of the drawings, a straight-line-motion mechanism 36, similar to a Scott-Russell straight-line-motion mechanism, is shown wherein the intermediate member 15 is constrained so that it can translate only in a direction perpendicular to the base 13. Similar mechanisms could be employed to limit translation in the other two major modes of travel. It is therefore to be understood that within the scope of the appended claims the invention may be practiced otherwise than as specifically described.

What is claimed is:

1. In a shock and vibration mount for a gyroscope, the combination of a base; a plurality of parallel shafts mounted perpendicular to said base; an intermediate member slidably mounted on said plurality of shafts; resilient means on said shafts interposed between said base and said intermediate member for supporting said intermediate member on said base; a first pair of parallel shafts rigidly connected to said intermediate member in a plane parallel to said base; first and second carriage members slidably mounted one each on said parallel shafts, said slidable carriage members being translatable on said shafts in a plane parallel to said base; a second pair of parallel shafts rigidly connected to said slidable carriage members in a plane parallel to said base and perpendicular to the said first pair of parallel shafts; a mounting plate member slidably mounted on said second pair of parallel shafts; and means for resisting movement of said slidable carriage members and said mounting plate member.

2. In a shock and vibration mount for a gyroscope as set forth in claim 1 wherein said means for resisting movement of said slidable carriage members and said mounting plate member comprises abutments on said shafts and helical compression springs disposed about said first and second pairs of parallel shafts between said slidable carriage and plate members and the respective abutments on the shafts upon which said members are mounted.

3. In a shock and vibration mount for a gyroscope as set forth in claim 1 wherein said means for resisting movement of said slidable carriage members and said mounting plate member comprises abutments on said shafts and rubber spacers disposed about said first and second pairs of parallel shafts between said slidable carriage and plate members and the respective abutments on the shafts upon which said members are mounted.

References Cited in the file of this patent

UNITED STATES PATENTS

| | | |
|---|---|---|
| 1,377,556 | Bridgeman | May 10, 1921 |
| 2,335,425 | Kouyoumjian | Nov. 30, 1943 |
| 2,513,834 | Zeidler | July 4, 1950 |
| 2,717,134 | Ferber | Sept. 6, 1955 |